…

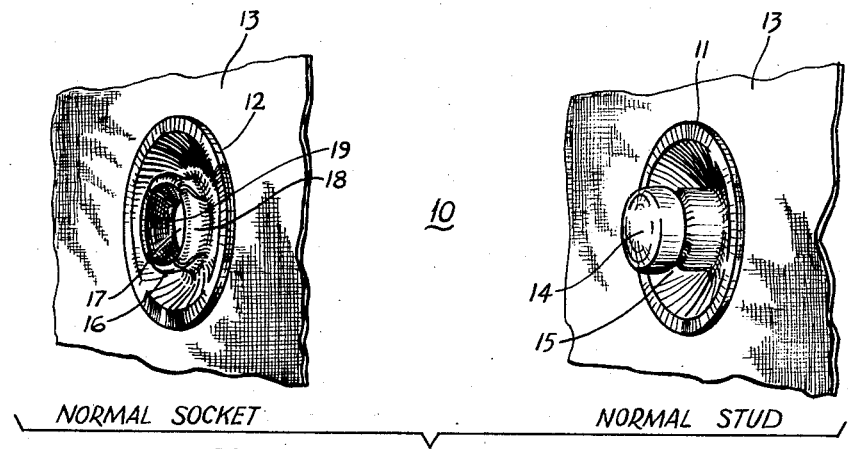
NORMAL SOCKET NORMAL STUD
Fig_1
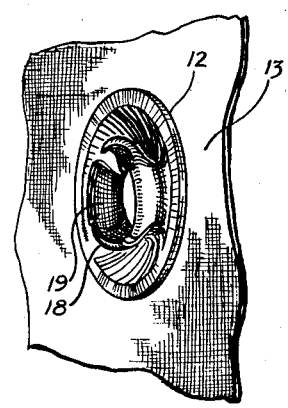
DAMAGED SOCKET
Fig_2
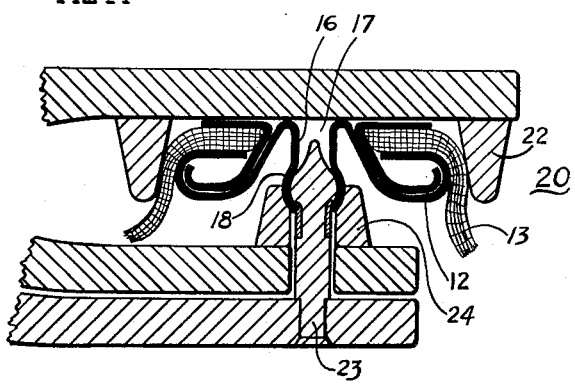
Fig_3
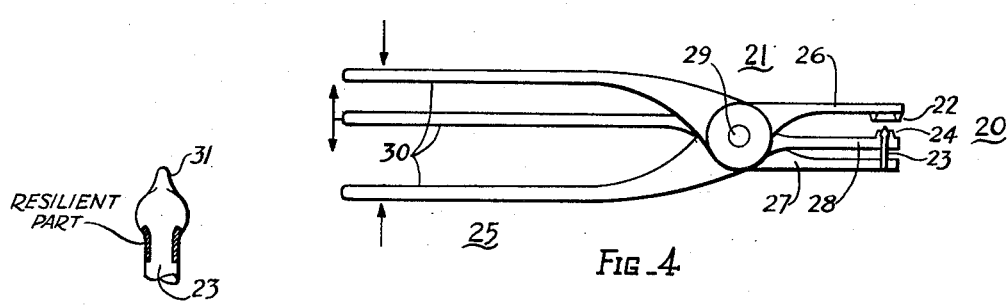
RESILIENT PART
Fig_5            Fig_4
INVENTOR.
Egon W. Mueller

United States Patent Office 2,810,312
Patented Oct. 22, 1957

2,810,312

MEANS FOR RESTORATION OF A DAMAGED SOCKET MEMBER OF A SNAP FASTENER

Egon W. Mueller, San Diego, Calif.

Application March 7, 1955, Serial No. 492,511

3 Claims. (Cl. 81—15)

The present invention relates generally to snap fasteners and more particularly to a means for reconditioning a worn or damaged snap fastener.

A snap fastener, of the type discussed herein, usually has a stud member and a socket member adapted to receive the stud member in close fitting and resilient gripping engagement. The resiliency of the socket member is necessary to firmly grip the stud member to keep the snap fastener closed or locked. This resiliency is provided by a plurality of resilient members which form the actual receiving socket of the socket member. These resilient members often become deformed due to rough handling of the snap fastener or merely from prolonged usage thereof. When this happens, the resilient members no longer firmly grip the stud member and in severe cases do not grip the stud member at all. Prior to the present invention it was necessary to discard the snap fastener and to replace it with a new one.

The present invention, however, obviates such replacement and enables reconditioning or restoring of the damaged resilient members to their original shape and working tolerance.

The present invention accomplishes this result by providing a new and novel means for restoration of damaged socket members comprising, a socket member retainer for holding and seating the socket member, a stud die for introduction into the socket of the socket member and an annular shaping die for encompassing engagement with the resilient members of the socket member. By applying force to the shaping die, thereby urging it into maximum engagement with the socket member, the resilient members are urged against the stud die for reforming or reshaping. Subsequent removal of the dies from the socket member will leave the reconditioned or restored socket member.

Accordingly, it is an object of the invention to provide a means for restoration of a snap fastener socket member.

It is another object of the invention to provide a means for restoration of a snap fastener socket member which is inexpensive to manufacture and lends itself to mass production techniques.

It is another object of the invention to provide the stated means which may be used as a plier type tool to effect operation thereof.

The novel features of my invention are set forth with particularity in the appended claims; the invention itself, however, together with additional objects and advantages thereof, will best be understood from the following description of a specific embodiment when read in connection with the accompanying drawings, wherein:

Figure 1 is a perspective view in elevation of a snap fastener in normal good operating condition;

Figure 2 is a perspective view in elevation of the socket member showing damaged resilient members;

Figure 3 is an enlarged view in section showing apparatus embodying the invention;

Figure 4 is a view in elevation showing the invention embodied in a plier like tool;

Figure 5 is a view in elevation of the stud die illustrating a spreader means for forcing apart resilient members.

The illustrated embodiment of the invention shows, in Fig. 1, a snap fastener 10 whose mating portions, stud member 11 and socket member 12, are carried by material such as cloth, plastic, rubber or the like 13. Socket member 12 is adapted to engage in resiliently tight gripping relation stud member 11. Stud member 11 is provided with a stud 14 which may have a shouldered part 15 to effect more positive locking with the socket member 12.

Socket member 12 is provided with a plurality of resilient members 16 which form a socket 17 adapted to receive stud 14 in gripping and locking engagement. Resilient members 16 are shown in their normal good operating condition in Figure 1 and have external portions 18 and internal portions 19. As the fastener is opened and closed in normal usage, or damaged in laundering or the like, the resilient members 16 generally open up or enlarge the socket 17 which then has damaged resilient central portions, as shown in Figure 2, thereby loosening or completely destroying the locking or gripping engagement heretofore possible with stud member 11.

To remedy this condition and restore the shaping and usefulness of the resilient members 16, means 20 for restoration of damaged resilient members 17, or their central portions, of the socket member 12 are utilized. These means 20 generally included a snap fastener rejuvenator 20 or a plier like tool 21 incorporating the snap fastener rejuvenator 20.

Snap fastener rejuvenator 20 comprises a socket member retainer or holding means 22, a stud die or element 23 and a shaping die or means 24. The socket member 12 is placed in the retainer 22. The stud die 23 is then inserted in socket 17 adjacent to and in spaced relation with internal portions 19. Shaping die 24 is then placed about external portions 18 of resilient members 16, partially or totally encompassing the external portions 18. Shaping die 24 is then forcefully seated against socket member 12. This action causes engagement of shaping die 24 against external portions 18 which in turn urges the internal portions 19 against stud die 23. Stud die 23 may be provided with a resilient part intermediate its ends (as shown in Fig. 5) to permit slightly excessive bending or restoration of the resilient members 16 to make socket 17 slightly smaller thereby increasing the gripping action upon stud 14. Subsequent withdrawal of stud die 23, after the reshaping action upon socket member 12, restores damaged socket member 12 from the condition shown in Fig. 2 to its normal condition as shown in Fig. 1.

Fig. 4 exemplifies the snap fastener rejuvenator 20 embodied in a plier like tool 21. The tool 21, which shows an exemplary mechanical actuating means has three arms, namely, a first arm 26, a second arm 27 and a third arm 28, all mounted intermediate their respective extremities in pivotal relation to each other at pivot 29. Each of the arms 26, 27, and 28 has adjacent one and the same extremity of each arm a part 30 for hand actuation thereof. The arms 26, 27 and 28 being moved for actuation of tool 21 as shown by the arrows adjacent part 30 in Fig. 4. The other extremity of first arm 26 has mounted thereon socket member retainer 22. The other extremity of the second arm 27 has mounted thereon stud die 23 in centered relation to retainer 22. The other extremity of the third arm 28 has shaping die 24 mounted thereon in spaced relation to stud die 23. Shaping die 24 is free to move independently of stud die 23 and along the length thereof.

Figure 5, a further modification of stud die 23 in which a spreader or spreading means 31 of any desired shape but shown as conical is utilized to effectuate a spreading action when the resilient members 16 are damaged by being pushed inward toward the socket 17. The spreader 31 may be used to spread resilient members 16 outward. The resilient part, as previously stated, may be provided in a portion of the periphery of stud die 23 to provide for relief of central portions 17 when they are forced against the die 23.

In operation, damaged socket member 12 is placed into retainer 22, stud die 23 is actuated into socket 17, spreading if necessary. Thereafter shaping die 24 is caused to engage resilient members 16 forcing or urging them against stud die 23. Shaping die 24 and stud die 23 are then removed leaving a socket member 12 whose resilient members 16 have been restored to useful stud member 14 gripping engagement and locking.

It will be apparent from the foregoing description that I have provided a novel snap fastener rejuvenator capable of restoring snap fasteners to good working condition, and I intend to be limited in my invention only to the extent indicated in the following patent claims.

I claim:

1. A device for the restoration of damaged resilient central portions of snap fastener socket members comprising socket member holding means, an element having spreading means for insertion within the damaged portions retained in said holding means, shaping means surrounding said element and cooperating with said spreading means to reform the damaged portions therebetween, and actuating means to operate first the spreading means and then the shaping means whereby the socket member is restored to its original shape for gripping relation with a complemental stud member.

2. A snap fastener repair tool as defined in claim 1, and including three levers pivoted together intermediate their ends to form handles extending in one direction from the pivot and jaws extending in the opposite direction, said handles defining said actuating means, and said holding means, said element, and said shaping means being secured to said jaws.

3. A snap fastener repair tool as defined in claim 2 and including a resilient part formed in at least a peripheral portion of said element intermediate its extremities.

References Cited in the file of this patent

UNITED STATES PATENTS

| | | |
|---|---|---|
| 318,412 | Bown | May 19, 1885 |
| 1,624,556 | Marshall | Apr. 2, 1927 |
| 1,839,501 | Rollason | Jan. 5, 1932 |
| 2,089,518 | Williams | Aug. 10, 1937 |
| 2,438,692 | Bourque | Dec. 12, 1952 |